United States Patent
Kimball

(10) Patent No.: US 10,144,656 B2
(45) Date of Patent: Dec. 4, 2018

(54) WATER FILTRATION AND PURIFICATION SYSTEM AND METHOD USING ACTIVATED CHARCOAL AND BARLEY STRAW

(71) Applicant: Kimball and Sons, Inc., Lubbock, TX (US)

(72) Inventor: Von D. Kimball, Lubbock, TX (US)

(73) Assignee: Kimball & Sons, Inc., Lubbock, TX (US)

( * ) Notice: Subject to any disclaimer, the term of this patent is extended or adjusted under 35 U.S.C. 154(b) by 185 days.

(21) Appl. No.: 15/231,526

(22) Filed: Aug. 8, 2016

(65) Prior Publication Data

US 2017/0036922 A1   Feb. 9, 2017

Related U.S. Application Data

(60) Provisional application No. 62/202,688, filed on Aug. 7, 2015.

(51) Int. Cl.

| | | |
|---|---|---|
| C02F 1/28 | (2006.01) |
| B01D 15/00 | (2006.01) |
| B01D 15/10 | (2006.01) |
| C02F 3/34 | (2006.01) |
| C05F 11/00 | (2006.01) |
| C05G 3/00 | (2006.01) |
| C05C 5/00 | (2006.01) |
| B01J 20/20 | (2006.01) |
| C02F 3/00 | (2006.01) |
| C02F 103/00 | (2006.01) |
| C02F 101/16 | (2006.01) |

(52) U.S. Cl.
CPC .............. *C02F 1/288* (2013.01); *B01D 15/10* (2013.01); *B01J 20/20* (2013.01); *C02F 1/283* (2013.01); *C02F 1/286* (2013.01); *C02F 3/348* (2013.01); *C05C 5/00* (2013.01); *C05F 11/00* (2013.01); *C05G 3/0047* (2013.01); *C02F 2003/003* (2013.01); *C02F 2101/163* (2013.01); *C02F 2103/007* (2013.01)

(58) Field of Classification Search
CPC ........ C05G 3/0058; C02F 1/283; C02F 1/286; C02F 1/288; C02F 3/348; D01D 15/10; B01J 20/20; C05C 5/00; C05C 11/00; C05C 3/0047
USPC ................................................ 210/610, 615
See application file for complete search history.

(56) References Cited

U.S. PATENT DOCUMENTS

| | | | |
|---|---|---|---|
| 3,533,961 A * | 10/1970 | Andries | C01B 32/384 201/23 |
| 5,498,384 A | 3/1996 | Volk et al. | |
| 6,149,929 A | 11/2000 | Friedman | |
| 6,224,764 B1 | 5/2001 | Matyushin et al. | |
| 6,740,232 B1 | 5/2004 | Beaulieu | |
| 8,080,160 B2 | 12/2011 | Yanou et al. | |
| 2002/0069685 A1* | 6/2002 | Adam | C05D 9/00 71/11 |
| 2005/0211627 A1 | 9/2005 | Zahn et al. | |
| 2007/0075018 A1* | 4/2007 | Richter | C02F 3/06 210/615 |
| 2010/0059438 A1 | 3/2010 | Bottcher | |
| 2013/0023409 A1 | 1/2013 | De Leij et al. | |
| 2014/0110316 A1 | 4/2014 | Shiue et al. | |
| 2014/0261466 A1 | 9/2014 | Yamanoi et al. | |
| 2014/0264157 A1 | 9/2014 | Kolomitsyn et al. | |
| 2014/0306148 A1 | 10/2014 | Kolomitsyn et al. | |
| 2014/0360889 A1 | 12/2014 | Jones et al. | |
| 2015/0114908 A1 | 4/2015 | Traxler et al. | |
| 2015/0140630 A1* | 5/2015 | Kennedy | C10L 5/08 435/167 |

FOREIGN PATENT DOCUMENTS

| | | |
|---|---|---|
| CN | 103787443 | 5/2014 |
| CN | 104028235 | 9/2014 |
| WO | 2003071874 | 9/2003 |

OTHER PUBLICATIONS

Plllinger et al, "Role of Phenolic Compounds in the Antialgal Activity of Barley Straw," Journal of CHemical Ecology vol. 20, No. 7, 1944, pp. 1557-1569 (Year: 1994).*
Iredale et al, "A series of experiments aimed at clarifying the mode of action of barley straw in cyanobacterial growth control", Water Research 46, 2012, pp. 6095-6103 (Year: 2019).*
Lembi, et al., "Barley Straw for Algae Control", Aquatic Plant Management, University of Purdue; www.agcom.purdue.edu/AgCom/Pubs, Aug. 1, 2002, 1-8.

* cited by examiner

*Primary Examiner* — Claire A Norris
(74) *Attorney, Agent, or Firm* — Law Office of Mark Brown, LLC; Ryan S. Hinderliter; Mark E. Brown

(57) ABSTRACT

A water filtration system and method combining the porous, filtering medium of activated charcoal with anti-algae effects of barley straw. Ground activated charcoal and ground barley straw are compressed into filtration matrices. Compressed filtration matrices are configured to be housed within a mesh container and for placement within an open pond or water tank. The water filtration system and method filters contaminants and inhibits algae growth in the water, thus cleaning, filtering, and clarifying the water.

10 Claims, No Drawings

WATER FILTRATION AND PURIFICATION SYSTEM AND METHOD USING ACTIVATED CHARCOAL AND BARLEY STRAW

CROSS-REFERENCE TO RELATED APPLICATION

This application claims priority in U.S. Provisional Patent Application No. 62/202,688, filed Aug. 7, 2015, which is incorporated herein by reference.

BACKGROUND OF THE INVENTION

1. Field of the Invention

The present invention relates generally to water purification and filtration.

2. Description of the Related Art

A common issue in open ponds, water tanks, and, more specifically, decorative ponds with fish, is preventing and/or controlling the growth of algae, especially floating algae, in the water. Fish produce waste which is composed of mostly ammonia and some solids. Natural bacteria converts the ammonia to nitrite and, in turn, to nitrate. Nitrates then fertilize the water, causing rapid growth of plants and various types of algae. Ammonia and nitrites are toxic to fish, so those levels are monitored in decorative ponds and tanks with fish, and various mechanical filters and/or biological mediums are used to filter out solid waste and to accelerate the natural conversion of nitrites to nitrates. These filters and/or mediums ensure that fish are not harmed by high levels of ammonia and/or nitrites. However, the resultant excess nitrates often cause algae growth to get out of hand, causing the water to appear green and surface algae to cover large portions of the water surface, giving the surface a green slimy appearance. Prevention and/or removal of algae from ponds and tanks is desirable for improved aesthetics.

Several remedies have been used in the past to filter water and/or try to control algae growth. One such remedy is the use of activated charcoal for filtering. Activated charcoal, sometimes referred to as activated carbon or activated coal, is charcoal heated in the presence of a gas, causing it to develop many internal spaces or pores. These small, low-volume pores largely increase the surface area of the activated charcoal for adsorption or chemical reactions.

Adsorption is the adhesion of atoms, ions, or molecules from a gas, liquid, or dissolved solid to a surface, while absorption is adhesion utilizing the whole volume of a material, adsorption is a surface-based process. The extremely porous activated charcoal can act as an adsorbent for contaminants in water, and the pores provide housings for microorganisms to convert ammonia to nitrites and nitrites to nitrates.

However, there is a misconception that activated charcoal removes ammonia, nitrites, and/or nitrates from water on its own. Although activated charcoal is effective in removing certain contaminants, including organics, it is not effective for removal of microbial contaminants, metals, nitrates, and other inorganic contaminants. So, while activated charcoal removes dissolved organic contaminants and impurities from water, the presence of activated charcoal alone can increase the conversion of ammonia and nitrites to nitrates, which ultimately contributes to increased algal growth.

Barley straw has previously been used for algae control. Natural bacteria found in water initiate the breakdown, or biodegradation, of barley straw. During biodegradation of barley straw, natural chemicals are released which inhibit algae growth. As the barley straw degrades, microbes cause the production of humic substances, which in this case are made up of Dissolved Organic Carbon (DOC). Humic acid interacts with sunlight and dissolved oxygen, becomes unstable, and decomposes into oxygen radicals. The oxygen radicals ultimately form low levels of hydrogen peroxide in the water. Hydrogen peroxide, even at low levels, has been shown to inhibit the growth of algae. However, hydrogen peroxide is highly unstable and high levels of it can harm fish and other life, so directly adding hydrogen peroxide to water would be ineffective and counterproductive. Instead, barley straw provides a continuous supply of DOC, which, in turn, produces a steady low supply of hydrogen peroxide to the pond or tank. This continuous supply of low levels of hydrogen peroxide can inhibit or reduce algae growth.

However, barley straw is somewhat difficult to use on its own because it is not a good filter medium, and it can become a nuisance when spread over the water. Also, when placed in water in bales or bundles, barley straw tends to decay into a form which is unattractive and clogs filtration systems.

Activated charcoal and barley straw each provide beneficial effects for filtering open pond and tank water to make it appear clearer. The present invention provides a system and method for utilizing the beneficial effects of both activated charcoal and barley straw.

BRIEF SUMMARY OF THE INVENTION

The present invention combines the porous, filtering medium of activated charcoal with the anti-algae effects of barley straw, creating a novel system and method for water filtration and purification.

Activated charcoal and barley straw can be combined and compressed into a filtration matrix for filtering and purifying water. This invention is an approach to cleaning, filtering and clarifying water by running it through a device containing pellets, briquettes, granules, etc. of a novel material made out of a mixture of activated carbon and barley straw.

DETAILED DESCRIPTION OF THE PREFERRED EMBODIMENTS

In a preferred embodiment of the present invention, activated charcoal and barley straw are ground up and mixed together. The activated charcoal, in one exemplary embodiment, is ground to a medium grind with a grinding machine, however fine or coarser grinds can alternatively be used. Barley straw can be ground up using a grinding machine, a blender, a food processor, or any other device capable of producing ground barley. The mixture of ground activated charcoal and ground barley straw is then compressed into a filtration matrix or system of the proper size, shape, and consistency to act as a filter medium for water in open ponds and tanks. The compressed filtration matrix may be a pellet, a briquette, a chunk, or any other type of filter medium. In one exemplary embodiment, each compressed filtration matrix is made up of a pellet approximately ¼ inch in diameter and ⅜ inch long. However, the size and shape of compressed filtration matrices embodying the present invention can vary tremendously. In one exemplary embodiment, each compressed filtration matrix is composed of approximately 70 percent activated charcoal and 30 percent barley straw, by weight. However, the ratio of activated charcoal to barley straw can also be greatly varied.

In the preferred embodiment, numerous compressed filtration matrices of the present invention are configured to be used in combination with and to be housed in, or contained within, a mesh container. However, in alternative embodiments larger filtration matrices may be used one at a time or in smaller numbers within a mesh container. The mesh container could be netting, a mesh bag, a mesh box, or any container capable of holding one or more compressed filtration matrices while allowing water to flow through. Mesh is intended to be defined broadly as a barrier made of connected strands, which allows liquids and small solids through it. Mesh is not intended to be limiting as to material and can be made up of plastic, metal, fabric, fibers, or any other type of connected strands. The mesh container, in the preferred embodiment, is placed under water and configured for suspending the compressed filtration matrices under water in a position where the water is being circulated.

Once positioned in the mesh container, the activated charcoal and barley straw compressed filtration matrices filter water as water circulates through. The biodegradation of the barley straw inhibits algae growth, and the pores within the activated charcoal provide a medium for filtering organic contaminants and organisms from the water. The combined filtration effects of activated charcoal and barley straw provide the water with a clear appearance. Optionally, the compressed filtration matrices may be mixed with pellets, briquettes, or chunks of a filler, such as vermiculite, within the mesh container to help with the mechanical filtration of the water.

After some time, all the barley straw within each compressed filtration matrix decays and is carried away by circulating water. When the compressed filtration matrices of the present invention are formed, barley straw takes up a significant portion of space within each filtration matrix. As the barley straw decays and is carried away, new pores open up within each filtration matrix. This novel feature results in activated charcoal which is even more porous, and thus an even better filter medium, than typical activated charcoal. These additional pores provide the activated charcoal of the compressed filtration matrix with added surface area to filter out organic contaminants from the water. The extra pores from the decayed barley straw effectively increase the useful life of the activated charcoal as the pores fill up with organic material. This extended useful life of activated charcoal makes the present invention more cost effective for consumers than use of standard activated charcoal for filtering. Once the pores in the activated charcoal are filled with organic material, it is time for the compressed filtration matrices to be replaced with unused compressed filtration matrices. The used compressed filtration matrices are then removed from the mesh container, and new, unused filtration matrices are placed within the container.

After removal from the water, the used or spent compressed filtration matrices can be used as a soil amendment. After filling up with organic material, each used filtration matrix can provide a good source of nitrates and organic material to soil. Thus, the used filtration matrices can be spaded into soil to fertilize and improve the soil.

The compressed filtration matrix of the present invention can be adapted to be many different sizes. Additionally, the invention can be configured for using one compressed filtration matrix at a time or multiple compressed filtration matrices at a time within water to be filtered, depending on the size of the pond or tank and the size of each filtration matrix. The invention may also be adapted for using one or multiple mesh containers at a time. In one common embodiment, several mesh containers, each holding numerous filtration matrices, are placed within a water filter housing, and water is pumped through them.

It is to be understood that the invention can be embodied in various forms, and is not to be limited to the examples discussed above. The range of components and configurations which can be utilized in the practice of the present invention is virtually unlimited.

Having thus described the disclosed subject matter, what is claimed as new and desired to be secured by Letters Patent is:

1. A system for water filtration comprising:
   ground activated charcoal;
   ground barley straw;
   said ground activated charcoal and said ground barley straw being compressed into a filtration matrix whereby said ground barley straw forms additional pores within said activated charcoal when compressed into said filtration matrix creating additional surface area for said activated charcoal when said barley straw degrades;
   said compressed filtration matrix being selected from the group consisting of: a pellet, a briquette, and a chunk;
   said compressed filtration matrix being configured for placement within water; and
   said compressed filtration matrix being configured for filtering contaminants and inhibiting algae growth in said water.

2. The system for water filtration according to claim 1, further comprising:
   a mesh container configured for housing said compressed filtration matrix and for being suspended below the surface of said water.

3. The system for water filtration according to claim 1, wherein:
   said compressed filtration matrix is configured for removal from said water and use as a soil amendment after filtration of said water.

4. A method for filtering water using activated charcoal and barley straw, the method comprising the steps of:
   grinding up activated charcoal;
   grinding up barley straw;
   mixing said ground activated charcoal and said ground barley straw;
   compressing said mixture of activated charcoal and barley straw into a filtration matrix whereby said ground barley straw forms additional pores within said activated charcoal when compressed into said filtration matrix;
   said compressed filtration matrix being selected from the group consisting of: a pellet, a briquette, and a chunk;
   placing said compressed filtration matrix within water;
   said ground barley straw biodegrading within said water;
   said biodegradation of said barley straw inhibiting growth of algae in said water;
   said degraded barley straw being carried away from said compressed filtration matrix via circulating water, creating additional empty pores within said activated charcoal of said compressed filtration matrix; and
   said compressed filtration matrix filtering contaminants in said water.

5. The method according to claim 4, further comprising the steps of:
   natural microbes within said water initiating biodegradation of said barley straw;
   said biodegradation of barley straw producing humic substances;
   said humic substances interacting with sunlight and dissolved oxygen, forming hydrogen peroxide;
   said hydrogen peroxide inhibiting growth of algae in said water;

organic material filling up said additional empty pores in said compressed filtration matrix; and removing said organic material-filled, compressed filtration matrix from said water.

6. The method according to claim 5, further comprising the steps of:

using said organic material-filled compressed filtration matrix as a soil amendment by spading said organic material-filled compressed filtration matrix into soil; and said organic material-filled compressed filtration matrix providing said soil with organic material and nitrates.

7. The method according to claim 5, further comprising the step of:

replacing said organic material-filled compressed filtration matrix in said water with an unused compressed filtration matrix.

8. The method according to claim 4, further comprising the steps of:

placing a mesh container configured for holding a filtration matrix suspended under water within said water; and wherein said placing said compressed filtration matrix within water comprises placing said compressed filtration matrix within said mesh container.

9. A method for filtering water using a compressed filtration matrix comprising ground activated charcoal and ground barley straw whereby said ground barley straw forms additional pores within said activated charcoal when compressed into said filtration matrix creating additional surface area for said activated charcoal when said barley straw degrades, said compressed filtration matrix being selected from the group consisting of: a pellet, a briquette, and a chunk, the method comprising the steps of:

placing said compressed filtration matrix within water;

natural microbes within said water initiating biodegradation of said barley straw;

said biodegradation of barley straw producing humic substances;

said humic substances interacting with sunlight and dissolved oxygen, forming hydrogen peroxide;

said hydrogen peroxide inhibiting growth of algae in said water;

said degraded barley straw being carried away from said compressed filtration matrix via circulating water, creating additional empty pores within said activated charcoal of said compressed filtration matrix; and said activated charcoal filtering contaminants from said water.

10. The method according to claim 9, further comprising the steps of:

removing said compressed filtration matrix from said water after use;

using said used compressed filtration matrix as a soil amendment by spading said used compressed filtration matrix into soil; and said used compressed filtration matrix providing said soil with organic material and nitrates.

* * * * *